(12) United States Patent
Schnyder et al.

(10) Patent No.: US 10,222,973 B2
(45) Date of Patent: Mar. 5, 2019

(54) METHOD FOR CONTROLLING A HEARING DEVICE VIA TOUCH GESTURES, A TOUCH GESTURE CONTROLLABLE HEARING DEVICE AND A METHOD FOR FITTING A TOUCH GESTURE CONTROLLABLE HEARING DEVICE

(71) Applicant: Sonova AG, Stäfa (CH)

(72) Inventors: Franz Schnyder, Jona (CH); Christian Frei, Stäfa (CH); Reto Kurmann, Stäfa (CH); Enea Affini, Stäfa (CH)

(73) Assignee: Sonova AG, Stäfa (CH)

( * ) Notice: Subject to any disclaimer, the term of this patent is extended or adjusted under 35 U.S.C. 154(b) by 0 days.

(21) Appl. No.: 15/314,531

(22) PCT Filed: May 30, 2014

(86) PCT No.: PCT/EP2014/061277
§ 371 (c)(1),
(2) Date: Nov. 29, 2016

(87) PCT Pub. No.: WO2015/180796
PCT Pub. Date: Dec. 3, 2015

(65) Prior Publication Data
US 2017/0199643 A1    Jul. 13, 2017

(51) Int. Cl.
*H04R 25/00* (2006.01)
*G06F 3/0488* (2013.01)

(52) U.S. Cl.
CPC ......... *G06F 3/0488* (2013.01); *H04R 25/558* (2013.01); *H04R 25/70* (2013.01);
(Continued)

(58) Field of Classification Search
CPC ............................. H04R 2225/61; G06F 3/043
See application file for complete search history.

(56) References Cited

U.S. PATENT DOCUMENTS

| 6,690,618 B2 * | 2/2004 | Tomasi | G01S 5/18 367/124 |
| 7,561,708 B2 * | 7/2009 | Rohrlein | H03G 3/04 381/312 |

(Continued)

FOREIGN PATENT DOCUMENTS

| EP | 183 908 B1 | 3/2002 |
| EP | 1 860 916 B1 | 11/2007 |

(Continued)

OTHER PUBLICATIONS

International Search Report for PCT/EP2014/061277 dated Aug. 19, 2014.
Written Opinion for PCT/EP2014/061277 dated Aug. 19, 2014.

*Primary Examiner* — Brian Ensey
*Assistant Examiner* — Ryan Robinson

(57) ABSTRACT

A method for controlling a hearing device via touch gestures carried out by a wearer of the hearing device. As part of the gesture a finger is swiped across first and second sound inlets of the hearing device. A gesture is detected by determining if a first output signal from a first microphone at the first sound inlet contains a component caused by the finger touching the hearing device at the first sound inlet and if a second output signal from a second microphone at the second sound inlet contains a component caused by the finger touching the hearing device at the second sound inlet. Based on the detected gesture a control signal changes a processing parameter or setting of a signal processing unit of the hearing device. Additionally, a hearing device capable of performing the proposed method and a method of fitting such a hearing device are provided.

11 Claims, 3 Drawing Sheets

(52) U.S. Cl.
CPC .... *H04R 2225/021* (2013.01); *H04R 2225/61* (2013.01); *H04R 2460/01* (2013.01)

(56) References Cited

U.S. PATENT DOCUMENTS

| | | | | |
|---|---|---|---|---|
| 8,824,712 B2* | 9/2014 | Sacha | ................... | H04R 25/50 |
| | | | | 381/321 |
| 9,042,571 B2* | 5/2015 | Dickins | ................. | H04R 1/083 |
| | | | | 345/177 |
| 9,635,477 B2* | 4/2017 | Lowmiller | ............ | H04R 25/65 |
| 2009/0123013 A1* | 5/2009 | Leong | ................. | H03K 17/955 |
| | | | | 381/324 |
| 2009/0323975 A1* | 12/2009 | Groesch | .............. | H04R 1/1091 |
| | | | | 381/71.1 |
| 2010/0202626 A1* | 8/2010 | Shiori | ................. | H04R 1/1091 |
| | | | | 381/74 |
| 2011/0091058 A1* | 4/2011 | Sacha | ................... | H04R 25/65 |
| | | | | 381/321 |
| 2011/0096036 A1* | 4/2011 | McIntosh | ............... | G06F 3/043 |
| | | | | 345/177 |
| 2011/0293102 A1 | 12/2011 | Kitazawa | | |
| 2013/0022214 A1 | 1/2013 | Dickins | | |

FOREIGN PATENT DOCUMENTS

| | | |
|---|---|---|
| EP | 2 112 672 A2 | 10/2009 |
| WO | 99/43193 A2 | 9/1999 |
| WO | 2007/068136 A2 | 6/2007 |
| WO | 2009/118221 A1 | 10/2009 |

* cited by examiner

METHOD FOR CONTROLLING A HEARING DEVICE VIA TOUCH GESTURES, A TOUCH GESTURE CONTROLLABLE HEARING DEVICE AND A METHOD FOR FITTING A TOUCH GESTURE CONTROLLABLE HEARING DEVICE

TECHNICAL FIELD

The present invention pertains to a method for controlling a hearing device as well as to a hearing device capable of performing the method. Furthermore, the present invention is related to a method for fitting such a hearing device.

BACKGROUND OF THE INVENTION

Hearing devices such as hearing aids (also referred to as hearing prostheses or hearing instruments) for hard of hearing people or hearing enhancement devices for augmenting the hearing capability of normal hearing persons, as well as hearing protection devices designed to prevent noise-induced hearing loss, commonly comprise an input transducer, e.g. a microphone, for picking up sound from the surroundings, a signal processing unit for processing the signal from the input transducer, and an output transducer, e.g. a miniature loudspeaker also called a receiver, for converting the processed signal into a signal perceivable by the user of the hearing device. Typically such hearing devices are adapted to be worn at the ear (e.g. a behind-the-ear, BTE hearing device) or within the ear canal (e.g. an in-the-ear, ITE or completely-in-canal, CIC hearing device), or alternatively be partly anchored in the scull (e.g. a bone-anchored hearing aid, BAHA) or partly implanted in the middle or inner ear (e.g. a direct acoustic cochlear stimulation, DACS, or cochlear implant). In order to allow the user of the hearing device to manually change certain settings, e.g. the volume level, or select another operational mode, e.g. switch to another hearing program, these hearing devices are usually equipped with one or more control elements such as a pushbutton (cf. e.g. EP2112672A2), a toggle switch (cf. e.g. EP1183908B1), a rocker (cf. e.g. EP1860916A2), a rotary switch (cf. e.g. WO2007/068136A2) or a touchpad (cf. e.g. WO2009/118221A1). There are a number of drawbacks with using such control elements in hearing devices, such as on the one hand requiring a lot a space in a miniature ear-level hearing device, thus enlarging the volume of the hearing device, and on the other hand being difficult to operate because of their tiny dimensions, especially for users with reduced dexterity, which is common amongst elderly people. Moreover, they increase component and manufacturing costs and their mechanical design with moving parts is often prone to failure for instance as a result of getting dirty. Furthermore, it is difficult to make a hearing device waterproof when utilising such known control elements. In order to overcome these problems a remote control unit can be employed as for instance provided in EP0175909A1. However, this also gives rise to considerable addition cost and the user is burdened with having to take along an extra device all the time and runs the risk of forgetting or losing it.

SUMMARY OF THE INVENTION

It is therefore an object of the present invention to provide an alternative means for controlling a hearing device which overcomes at least some of the disadvantages of the prior art solutions, such as requiring substantial space, incurring high cost, being tedious to operate, offering only limited control functionality and being maintenance-intensive or repair-prone. This object is reached by the method for controlling a hearing device according to claim 1 and the hearing device according to claim 11. Specific embodiments of the proposed method and device are provided in the dependent claims 2 to 10 and 12, respectively. In a further aspect, claim 13 suggests a method for fitting a hearing device according to the present invention, which allows to address the individual preferences of the user for controlling the hearing device according to the present invention.

The present invention is first directed to a method for controlling a hearing device, the hearing device comprising a housing with a first and a second sound inlet, a first microphone arranged at the first sound inlet and a second microphone arranged at the second sound inlet, a signal processing unit and an output transducer, in particular an electrical-to-mechanical converter such as an electrical-to-acoustical converter, e.g. a miniature loudspeaker, direct acoustic cochlear stimulator (DACS) or cochlear implant, the method comprising the steps of:

detecting a touch gesture carried out by a wearer of the hearing device using a finger, wherein as part of the touch gesture the finger is swiped across the first sound inlet and the second sound inlet, by determining if a first output signal from the first microphone contains a component caused by the finger touching, i.e. being in physical contact with, the hearing device at the first sound inlet and if a second output signal from the second microphone contains a component caused by the finger touching, i.e. being in physical contact with, the hearing device at the second sound inlet, in particular in moving physical contact;

selecting a control signal from a plurality of control signals based on the step of detecting;

providing the selected control signal to the signal processing unit; and changing at least one processing parameter or setting of the signal processing unit dependent on the selected control signal.

The wearer of the hearing device thus performs the touch gesture using a finger, whereby the finger is swiped across the first sound inlet and the second sound inlet, so that during the touch gesture the finger is in physical contact with the hearing device.

In an embodiment of the method different touch gestures result in selecting different control signals.

In a further embodiment of the method the touch gesture comprises at least one of the following:
a) swiping the finger from the first sound inlet to the second sound inlet;
b) swiping the finger from the second sound inlet to the first sound inlet;
c) successively performing a) and then b) or successively performing b) and then a);
d) repeating one of a), b) and c) at least once;
e) prior or subsequent to a), b), c) and d) tapping the finger on the housing one or more times;
f) prior or subsequent to a), b), c) and d) tapping the finger on the first sound inlet and/or the second sound inlet one or more times.

In yet a further embodiment of the method the step of detecting a touch gesture comprises determining at least one of the following:
a time difference between when the finger touches, e.g. achieves physical contact with, the hearing device at the first sound inlet and when the finger touches, e.g.

achieves physical contact with, the hearing device at the second sound inlet, or vice-versa, in particular a swiping speed of the finger between the first and second sound inlet, or vice-versa;

a time difference between tapping the finger on the first and/or second sound inlet, in particular a tapping rate of the finger at the first and/or second sound inlet.

In yet a further embodiment of the method the step of selecting the control signal is dependent on the swiping speed and/or the tapping rate.

In yet another embodiment the method further comprises applying touch noise cancellation to a signal derived from the first output signal and/or the second output signal and providing a resulting signal to the output transducer, in particular attenuating a signal provided to the output transducer, when having detected that the first output signal contains a component caused by the finger touching, i.e. being in physical contact with, the hearing device at the first sound inlet and/or that the second output signal contains a component caused by the finger touching, i.e. being in physical contact with, the hearing device at the second sound inlet.

In yet another embodiment the method further comprises provided an acknowledgement signal, e.g. a specific one from a plurality of acknowledgement signal, to the output transducer dependent on the selected control signal.

In yet a further embodiment of the method the step of detecting a touch gesture comprises determining a spectrogram of the first and the second output signal.

In yet a further embodiment of the method the step of detecting a touch gesture comprises extracting at least one characteristic feature representative of the touch gesture from the first and the second output signal, and wherein the step of selecting comprises determining if the at least one characteristic feature is within a predetermined range, and if so selecting the control signal associated with the predetermined range.

In yet a further embodiment of the method the touch gesture is individually selected by the wearer of the hearing device and at least one characteristic feature representative of the individually selected touch gesture is stored in a memory unit (e.g. non-volatile memory, NVM) of the hearing device during fitting of the hearing device to preferences of the wearer of the hearing device.

It is expressly pointed out that the above-mentioned embodiments can be arbitrarily combined to yield further specific embodiments of the method according to the present invention.

Furthermore, the present invention is directed to a hearing device capable of performing the proposed method of controlling.

Such a hearing device comprises a housing with a first sound inlet and a second sound inlet, a first microphone arranged at the first sound inlet and a second microphone arranged at the second sound inlet, a signal processing unit and an output transducer, and is characterised in that the hearing device further comprises a touch gesture detection unit adapted to perform the steps of:

detecting a touch gesture carried out by a wearer of the hearing device using a finger, wherein as part of the touch gesture the finger is swiped across the first sound inlet and the second sound inlet (and wherein during the touch gesture the finger is in physical contact with the hearing device), by determining if a first output signal from the first microphone contains a component caused by the finger touching the hearing device at the first sound inlet and if a second output signal from the second microphone contains a component caused by the finger touching the hearing device at the second sound inlet;

selecting a control signal from a plurality of control signals based on the step of detecting;

providing the selected control signal to the signal processing unit; and changing at least one processing parameter or setting of the signal processing unit dependent on the selected control signal.

In an embodiment of the hearing device different touch gestures result in selecting different control signals.

In a further embodiment of the hearing device the touch gesture comprises at least one of the following:

a) swiping the finger from the first sound inlet to the second sound inlet;

b) swiping the finger from the second sound inlet to the first sound inlet;

c) successively performing a) and then b) or successively performing b) and then a);

d) repeating one of a), b) and c) at least once;

e) prior or subsequent to a), b), c) and d) tapping the finger on the housing one or more times;

f) prior or subsequent to a), b), c) and d) tapping the finger on the first sound inlet and/or the second sound inlet one or more times.

In yet a further embodiment of the hearing device the touch gesture detection unit is further adapted to determine at least one of the following:

a time difference between when the finger touches, e.g. achieves physical contact with, the hearing device at the first sound inlet and when the finger touches, e.g. achieves physical contact with, the hearing device at the second sound inlet, or vice-versa, in particular a swiping speed of the finger between the first and second sound inlet, or vice-versa;

a time difference between tapping the finger on the first and/or second sound inlet, in particular a tapping rate of the finger at the first and/or second sound inlet.

In yet a further embodiment of the hearing device touch gesture detection unit is further adapted to select the control signal (in an associated control signal selection unit) dependent on the swiping speed and/or the tapping rate.

In yet another embodiment the hearing device further comprises a touch noise cancellation unit adapted to apply touch noise cancellation to a signal derived from the first output signal and/or the second output signal and to provide a resulting signal to the output transducer, in particular to attenuate a signal provided to the output transducer, when having detected that the first output signal contains a component caused by the finger touching, i.e. being in physical contact with, the hearing device at the first sound inlet and/or that the second output signal contains a component caused by the finger touching, i.e. being in physical contact with, the hearing device at the second sound inlet.

In yet a further embodiment of the hearing device the touch gesture detection unit is further adapted to provide an acknowledgement signal, e.g. a specific one from a plurality of acknowledgement signal, to the output transducer dependent on the selected control signal.

In yet a further embodiment of the hearing device the touch gesture detection unit is further adapted, as part of detecting a touch gesture, to determine a spectrogram of the first and the second output signal.

In yet a further embodiment of the hearing device the touch gesture detection unit is further adapted, as part of detecting a touch gesture, to extract at least one characteristic feature representative of the touch gesture from the first and the second output signal, and as part of selecting the control signal, to determine if the at least one characteristic feature is within a predetermined range, and if so selecting the control signal associated with the predetermined range.

It is again expressly pointed out that the above-mentioned embodiments can be arbitrarily combined to yield further specific embodiments of the hearing device according to the present invention.

Furthermore, the present invention is directed to a method of fitting a hearing device according to the present invention.

Such a method for fitting a hearing device according to the present invention to preferences of the wearer of the hearing device comprises the steps of:

the wearer of the hearing device performing a touch gesture using a finger, wherein as part of the touch gesture the finger is swiped across the first sound inlet and the second sound inlet, and wherein during the touch gesture the finger is in physical contact with the hearing device;

extracting at least one characteristic feature representative of the touch gesture from a first output signal from the first microphone and from a second output signal from the second microphone, for instance by evaluating a spectrogram of the first and the second output signal, in particular a speed and/or a direction, for instance from the first to the second sound inlet, at and/or in which the swiping takes place;

assigning a control signal from a plurality of control signals to the at least one extracted characteristic feature, thus establishing an association between the assigned control signal and the at least one characteristic feature.

In an embodiment of the fitting method the predetermined range and the association of the control signal with the predetermined range is established during fitting of the hearing device to preferences of the wearer of the hearing device.

BRIEF DESCRIPTION OF THE DRAWINGS

The present invention will now be further illustrated by way of exemplified embodiments shown in the accompanying drawings and described in detail in the following. It is pointed out that these embodiments are for illustrative purposes only and shall not limit the present invention as set out by the claims.

The same reference signs used in different figures refer to the same parts or functionality.

DETAILED DESCRIPTION OF THE INVENTION

Figure 1:
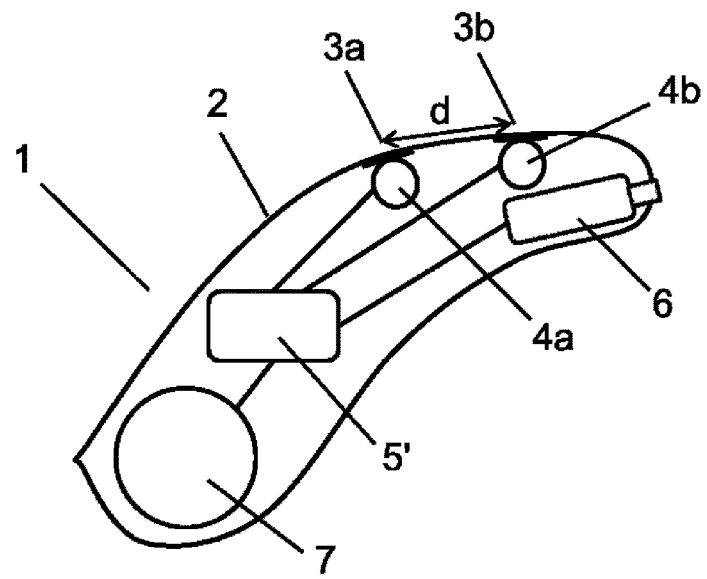
FIG. 1 shows a simple block diagram of a BTE hearing device according to the present invention.

FIG. 1 depicts a simple block diagram of a BTE hearing device 1 according to the present invention for being worn behind the ear of a user. The hearing device is powered by a battery 7 and comprises a housing 2 with a first sound inlet 3a and a second sound inlet 3b. Ambient sound from the surroundings as well as the sound produced by a finger of the user of the hearing device 1 when touching the housing 2 or when in moving physical contact, e.g. swiping across the location of the first and second sound inlet 3a, 3b is picked-up by a first, rear microphone 4a arranged at the first sound inlet 3a and a second, front microphone 4b arranged at the second sound inlet 3b. A block 5' is provided to perform all the necessary signal processing of the signals output by the front and rear microphones 4b, 4a. This signal processing on the one hand comprises known processing of the ambient sound, for instance by applying a frequency-dependent amplification and/or beamforming, aimed at enhancing the user's hearing ability such that the user can for example better understand a conversation in a noisy environment. The signal resulting from this processing is output via the receiver 6 into the ear canal of the user. On the other hand the signal processing comprises touch gesture detection based on the sound generated by the user's finger moving across the housing 2 at the first and second sound inlets 3a, 3b. The characteristics of sound caused by direct contact with the housing 2 are very different from sound reaching the sound inlets 3a, 3b through the air. This allows to reliably distinguish between ambient sound and sound resulting from touching the housing 2. The latter sound is preferably cancelled out and prevented from being output by the receiver 6 (as shall be described later) because this will likely be annoying for the user. The distance d between the two microphones 4a, 4b is chosen to be as large as possible in order to achieve good beamforming performance. This also allows a good discrimination of the origin of touching sounds provided by the gestures performed by the user's finger in order to be able to reliably detect a plurality of different touch gestures.

Figure 2:
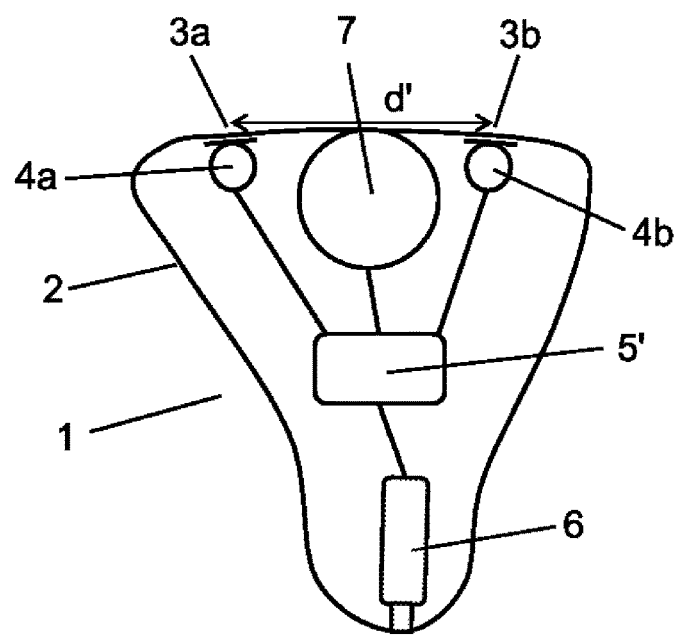
FIG. 2 shows a simple block diagram of an ITE hearing device according to the present invention.

Likewise, FIG. 2 shows a simple block diagram of an ITE hearing device 1 according to the present invention intended to be worn by a user at least partly within the ear canal. Here the distance d' between the two microphones 4a, 4b typically smaller than a typical distance d for a BTE hearing device 1, however it is still sufficient to achieve a reasonable beamforming performance as well as the reliable detection of a plurality of different touch gestures.

Such a dual-microphone hearing device therefore allows to detect several different gestures so that the user can for instance change hearing programs, adjust the volume settings as well as provide feedback to the hearing device as part of an interaction. It should be noted that more than two microphones could be used to implement the method and hearing device according to the present invention.

Figures 3A, 3B, 3C:
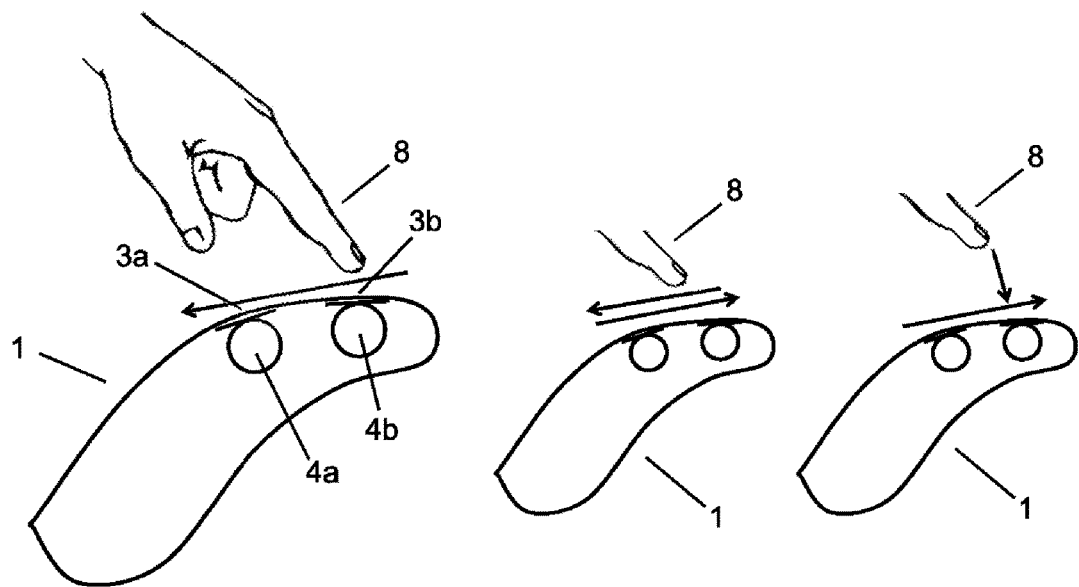
FIG. 3a-c show three different touch gestures applied by a finger of a user to a BTE hearing device according to the present invention.

FIG. 3 illustrates three different touch gestures that can easily be recognised by the hearing device 1. In FIG. 3a) the user swipes a finger 8 from the second, i.e. front, sound inlet 3b to the first, i.e. back, sound inlet 3a. A sound peak caused by the finger 8 is therefore received first by the second, i.e. front, microphone 4b and slightly later by first, i.e. rear, microphone 4a. The time delay between the sound peak pick-up by the front microphone 4b and the sound peak pick-up by the rear microphone 4a is dependent on the speed at which the user moves the finger 8. This time difference can for instance be employed to initiate different control signals.

As an example swiping the finger 8 from the front sound inlet 3b to the rear sound inlet 3a could be used to reduce the volume. On the other hand, swiping the finger 8 from the rear sound inlet 3a to the front sound inlet 3b could then be employed to increase the volume. The increment of the increase could be dependent on the swiping speed.

In FIG. 3b) the user swipes his finger 8 from the rear sound inlet 3a to the front sound inlet 3b and then back again to the rear sound inlet 3a. The number of times the finger swipes back and forth between the two sound inlets 3a, 3b can be used to distinguish different commands. For example swiping back and forth once could lead to a change of the hearing program.

As shown in FIG. 3c), swiping between the two sound inlets 3a, 3b can be combined with tapping on the housing 2. In this way a large number of different touch gestures can be distinguished in order to provide many different commands to the hearing device 1. These different commands are detected based on swiping direction and speed as well as tapping location and rate characteristic for the various touch gestures. For example swiping the finger 8 from the rear sound inlet 3a to the front sound inlet 3b could be used to initiate a gradual volume increase which is stopped by a single finger tap at the location of the front sound inlet 3b.

The user can especially chose appropriate touch gestures himself during fitting of the hearing device. In this way controlling of the hearing device is individually adapted to the user's preferences and capabilities.

Figure 4:
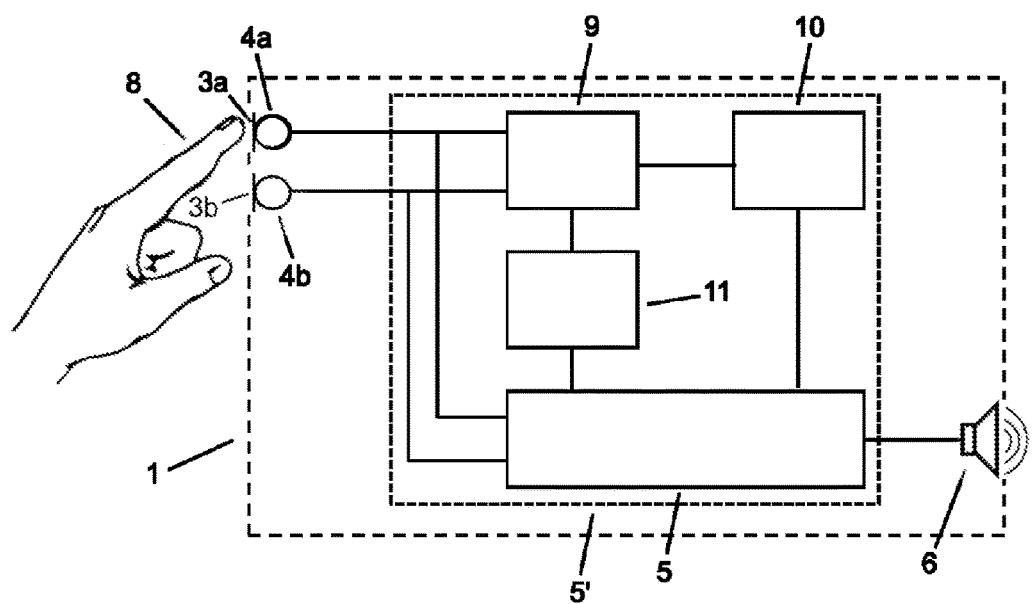
FIG. 4 shows a more detailed block diagram of a hearing device according to the present invention.

A more detailed block diagram of a hearing device 1 according to the present invention is given in FIG. 4. Touch gesture detection is performed by the unit 9 based on the two signal output by the first microphone 4a and the second microphone 4b, respectively. Different touch gestures are then mapped to different command or control signals in the control signal selection unit 10. The sounds caused when touching the housing 2 are typically loud compared with the ambient sound and can therefore be annoying for the user. As mentioned above, the sounds resulting from the touch gestures may thus be cancelled out by means of the touch noise cancellation unit 11, so that they are prevented from being output via the receiver 6.

Swiping a finger 8 in succession across the two sound inlets 3a, 3b can for instance be detected using a spectrogram. When the finger 8 is sliding over the first sound inlet 3a the microphone 4a outputs a broadband signal, whereas the microphone 4b at the same time outputs a signal with energy concentrated in the low frequency part of the spectrum (likely because of the mechanical coupling between the two microphones). When the finger 8 is sliding over the second sound inlet 3b the microphone 4b outputs a broadband signal, whereas the microphone 4a at the same time outputs a signal with energy concentrated in the low frequency part of the spectrum. This behaviour is almost perfectly symmetrical if the finger 8 finds no obstacle between the two sound inlets 3a, 3b. With ITEs having e.g. a pushbutton in-between the two sound inlets 3a, 3b, the high frequency content of the signal output by the microphone being touched last is rolled-off compared to the high frequency content of the signal output by the microphone being touched first. These patterns can be easily detected in practice by using thresholds set at different frequency bins (or Bark bands) and by measuring the time delay $\Delta t$ between peaks in the signals from the two microphones 4a, 4b when these thresholds are exceeded.

Figure 5:
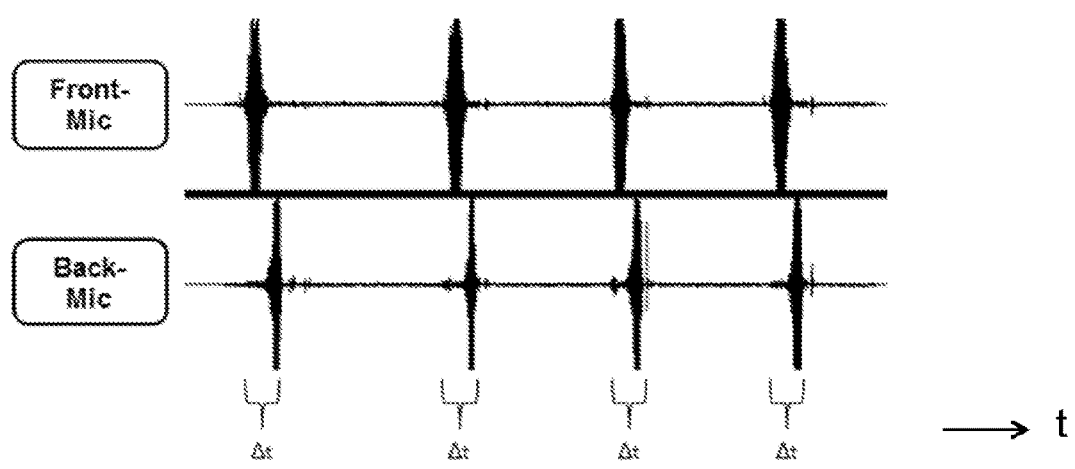
FIG. 5 shows a more detailed block diagram of a hearing device according to the present invention.

As an example, FIG. 5 depicts the output signals of the two microphone 4b (top) and 4a (bottom) for a touch gesture where the finger 8 is swiped from the front sound inlet 3b to the rear sound inlet 3a four times.

The proposed touch gesture controllable hearing device employing two spaced-apart microphones provides the following benefits:

avoids the use of wear-sensitive mechanical parts such as buttons or wheels, thus improving the reliability of the hearing device;

reduces the production costs by eliminating components and simplifying product assembly;

reduces the hearing device's size and improves its cosmetic appearance;

allows the user to change more hearing device settings by being able to detect an increased number of inputs/commands;

less tedious than manually operating a tiny control element.

What is claimed is:

1. A method for controlling a hearing device, the method comprising:
   detecting a touch gesture carried out by a wearer of the hearing device using a finger, wherein the touch gesture is associated with an audio signal for the finger swiping across a first sound inlet and a second sound inlet, wherein the audio signal includes a first component caused by the finger touching the hearing device at the first sound inlet and second component caused by the finger touching the hearing device at the second sound inlet and a time difference between the first and second component;
   selecting a control signal from a plurality of control signals based on detecting the touch gesture;
   providing the selected control signal to a signal processing unit;
   changing at least one processing parameter or setting of the signal processing unit dependent on the selected control signal;
   applying noise cancellation to the audio signal to generate a modified signal, wherein applying the noise cancellation is based on the first component, the second component, and the time difference between the first and second component; and
   providing the modified signal to an ear canal, wherein the ear canal is associated with the wearer of the hearing device.

2. The method of claim 1, wherein the touch gesture is a first touch gesture, and wherein different touch gestures result in selecting different control signals.

3. The method of claim 1, wherein the touch gesture further comprises:
   swiping the finger from the first sound inlet to the second sound inlet; or
   swiping the finger from the second sound inlet to the first sound inlet.

4. The method of claim 1, wherein selecting the control signal is further based on a swiping speed or a tapping rate.

5. The method of claim 1, further comprising providing an acknowledgement signal to an output transducer based on the selected control signal.

6. The method of claim 1, wherein detecting the touch gesture further comprises determining a spectrogram of the audio signal.

7. A hearing device, the hearing device comprising:
   a housing with a first and a second sound inlet;
   a first microphone disposed at the first sound inlet;
   a second microphone disposed at the second sound inlet;
   a processing unit;
   an output transducer,
   a memory electronically coupled to the processing unit, wherein the memory stores instructions that when executed by the processing unit cause the hearing device to perform operations, the operations comprising:

detecting a touch gesture carried out by a wearer of the hearing device using a finger,
        wherein as part of the touch gesture the finger is swiped across the first sound inlet and the second sound inlet, wherein the touch gesture generates an audio signal from the finger swiping across the first sound inlet and the second sound inlet, wherein the audio signal includes a first component and second component caused by the finger swiping across the first and second sound inlets and the audio signal includes a time difference between the first and second components;
    selecting a control signal from a plurality of control signals based on detecting the touch gesture;
    providing the selected control signal to the processing unit;
    changing a processing parameter or setting of the processing unit based on the selected control signal;
    applying touch noise cancellation to an output signal based on the first component, the second component, and the time difference; and
    providing a resulting signal to the output transducer.

8. A non-transitory computer-readable medium storing instructions that when executed by a processor cause a hearing device to perform operations, the operations comprising:

detecting a gesture based on receiving a first input signal, wherein the first input signal comprises:
        a first portion associated with a finger swiping across a first sound inlet,
            wherein the first portion has a first sound feature;
        a second portion associated with the finger swiping across a second sound inlet,
            wherein the second portion has a second sound feature,
            wherein the first input signal has a time difference between the first feature and the second feature caused by the finger touching the hearing device at the first inlet and the second inlet;
    in response to detecting the gesture:
        modifying a parameter of the hearing device based on the gesture;
        applying signal cancelling to an output signal,
            wherein the signal cancelling cancels sound associated with the first and the second features; and
        providing the output signal to a receiver, wherein the receiver is associated with a wearer of the hearing device.

9. The non-transitory computer readable medium of claim 8, wherein detecting the gesture further comprises evaluating a spectrogram of the first signal to determine a speed or a direction of the swiping.

10. The non-transitory computer readable medium of claim 8, wherein the gesture is further associated with:

a swiping speed of the finger; or a tapping rate of the finger.

11. The method of claim 1, wherein the gesture is a first gesture, and the operations including detecting a second gesture, wherein the first and second gestures are different.

\* \* \* \* \*